A. LESPAGNOL.
AUTOMATIC STONE SAWING MECHANISM.
APPLICATION FILED JUNE 21, 1912.
1,155,156.
Patented Sept. 28, 1915.
3 SHEETS—SHEET 2.
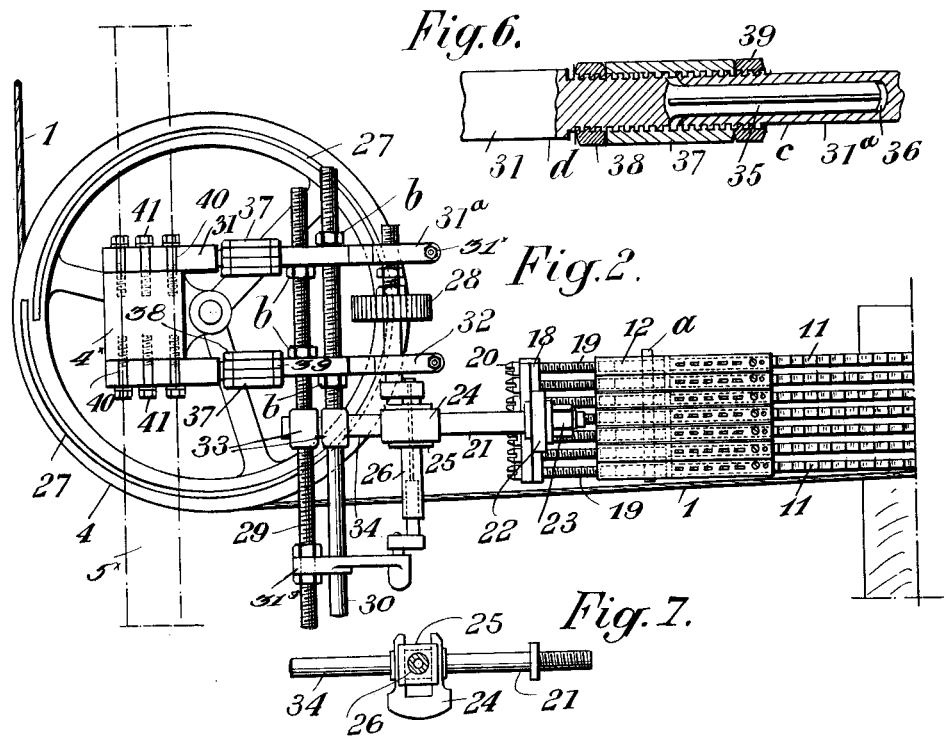
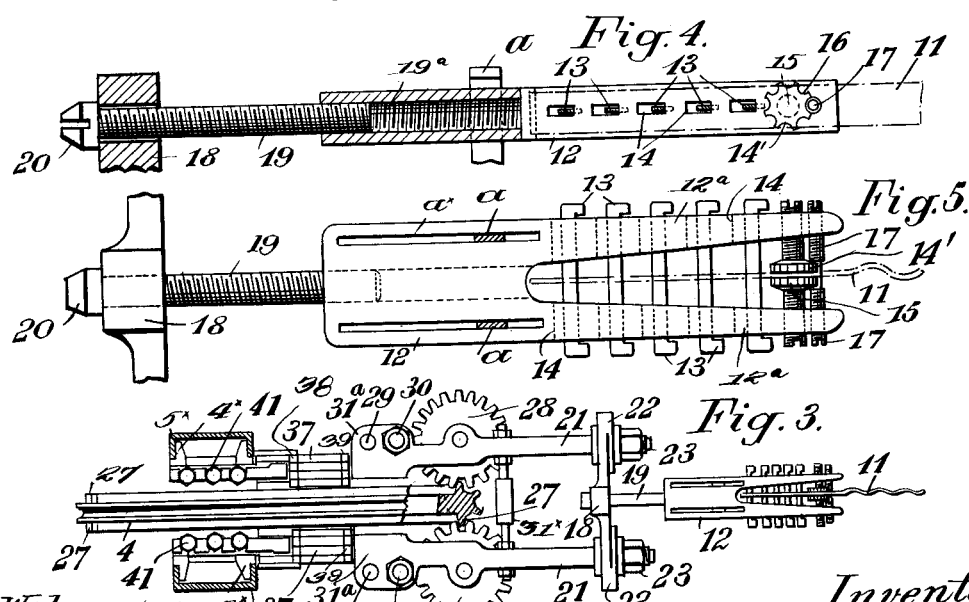

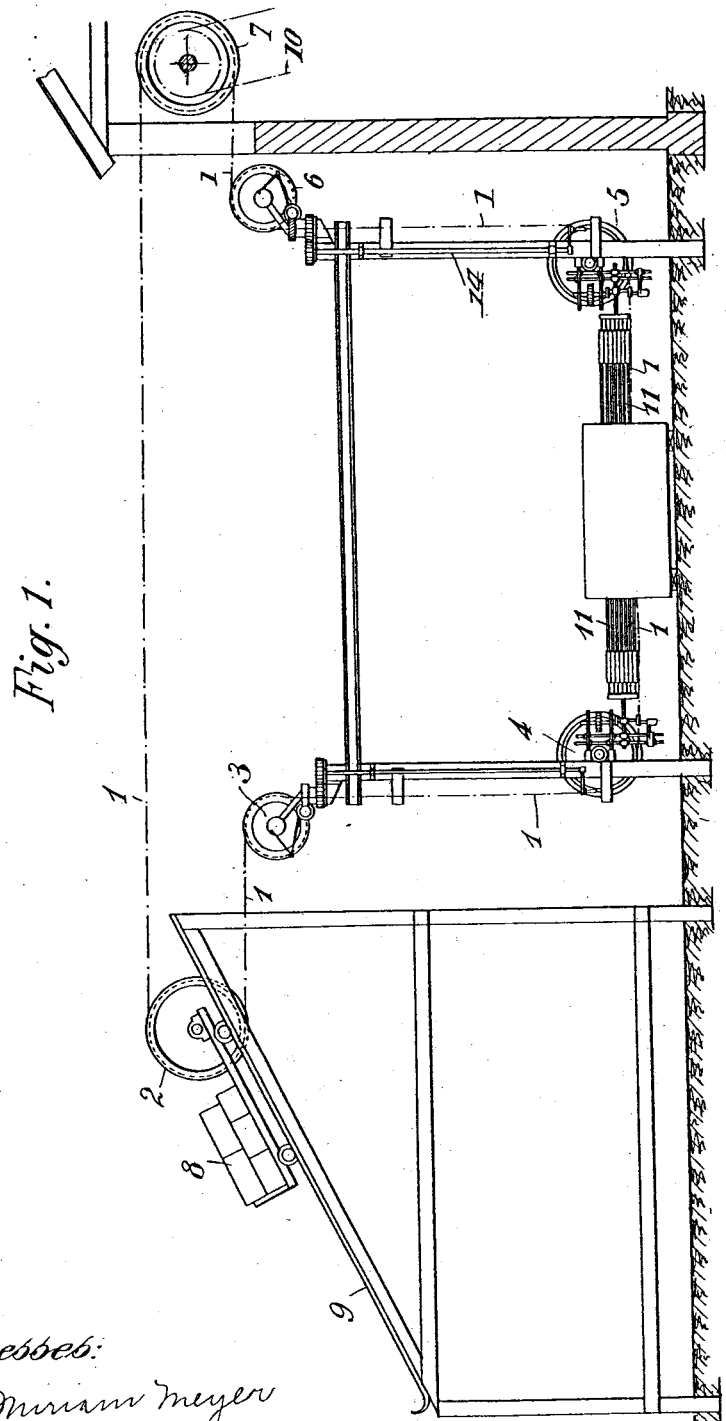

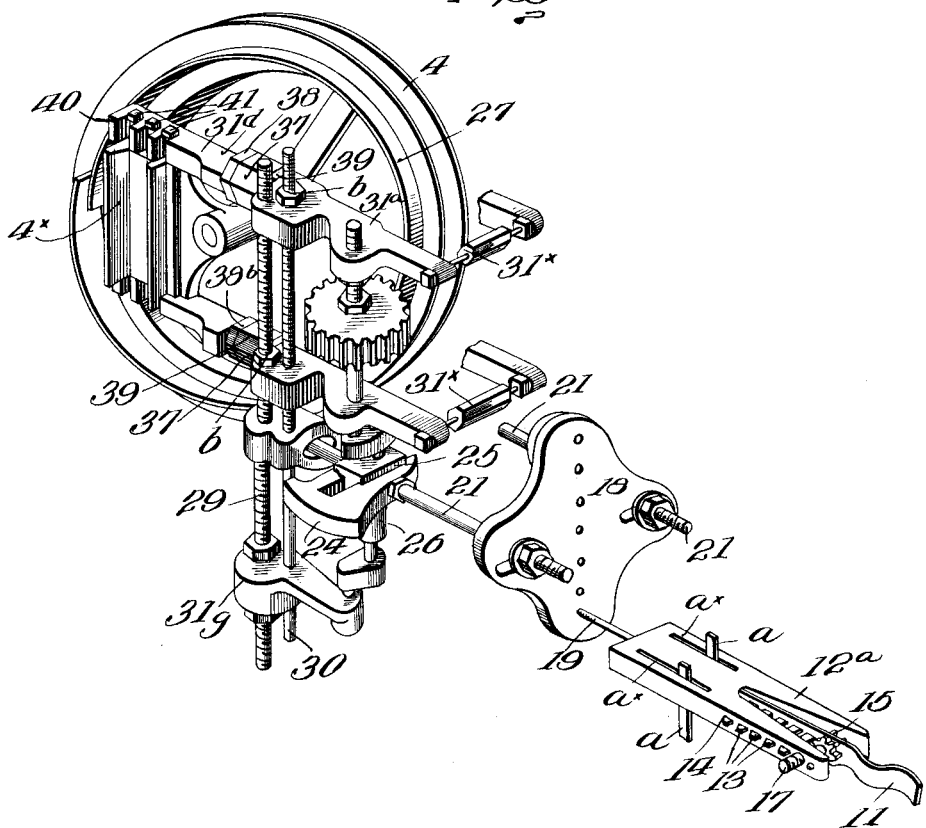

UNITED STATES PATENT OFFICE.

ALBERT LESPAGNOL, OF BOIS-COLOMBES, FRANCE.

AUTOMATIC STONE-SAWING MECHANISM.

1,155,156.          Specification of Letters Patent.      Patented Sept. 28, 1915.

Application filed June 21, 1912. Serial No. 705,127.

*To all whom it may concern:*

Be it known that I, ALBERT LESPAGNOL, a citizen of the French Republic, and resident of Bois-Colombes, Seine, France, have invented certain new and useful Improvements in Automatic Stone-Sawing Mechanism, of which the following is a specification.

This invention relates to improvements in stone sawing mechanism, and has for its prime object the provision of means for holding the usual wire, employed as a saw, in close contact with the material being cut.

A further object of the invention is to provide means for holding a saw in contact with the work, and so construct the parts as to permit free passage of sand or the like to the saw, and at the same time remove surplus sand from the kerf.

Other objects and advantages will be hereinafter described and particularly pointed out in the claims.

In the drawings:—Figure 1 is a diagrammatic side elevation of a saw, equipped with my invention. Fig. 2 is a detail enlarged side elevation of one end of the improved means for holding the wire saw in contact with the work. Fig. 3 is a plan view of the mechanism shown in Fig. 2, the saw guiding wheel being shown partly in section. Fig. 4 is a detail side elevation of the blade clamp, parts being in section. Fig. 5 is a plan view of the blade clamp shown in Fig. 4. Fig. 6 is a detail section of one of the adjustable supports. Fig. 7 is a detail plan view of the blade reciprocating means. Fig. 8 is a detail perspective view of a portion of the saw operating mechanism.

1 indicates a wire saw of ordinary construction 2, 3, 4, 5, 6, and 7, representing pulleys over which the wire passes. The pulley 2, is mounted in bearings on a carriage 8, designed to operate on inclined rails 9, whereby to keep the wire taut.

Motion is imparted to the wire 1, by a belt 10, which passes over a pulley mounted on the shaft of the pulley 7. The pulleys 4 and 5 over which the cutting portion of the wire saw passes are allowed to feed down automatically by gravity, and can be elevated so as to raise the saw out of the cut by rotating the pulleys 3 and 6 by any suitable mechanism such as that shown diagrammatically on Fig. 1.

The mechanism thus far described is of well known construction, and forms no specific part of my invention, and it is therefore thought that further description will be unnecessary, and that the diagrammatic illustration shown in Fig. 1 will enable one skilled in the art to fully understand the application of my invention, which I will now proceed to describe.

My improvement is designed primarily to hold the saw in close contact with the stone being cut, and to properly distribute the sand in the kerf and to remove the surplus sand.

The pulleys 4 and 5, and their connections with the blades which bear on the saw, are identical in structure, and for convenience, I will describe but one pulley, and its connections.

The pulley is mounted on a shaft, having bearings in blocks $4^x$—$4^x$, which move in standards $5^x$—$5^x$, and on opposite sides of the pulley are spiral ribs 27. Adjustably secured to the blocks $4^x$—$4^x$, by bolts 41 which pass through open slots 40, are supports 31, the ends $d$ of which are threaded and reduced as at 35. Members $31^a$ are threaded at their ends, which are also provided with sockets 36 in which are spined the reduced extensions 35 of the supports 31. Engaging the threaded ends of the supports 31, and the members $31^a$, are nuts 37, locked in set position by jam nuts 38 and 39. The members $31^a$, are connected in pairs by cross bolts $31^x$, as clearly shown in Figs. 2 and 3. Below the members 31 and $31^a$ are similar members 32, the members $31^a$ and 32 being provided with unthreaded registering openings which form bearings for the vertical threaded rods 29 and 30 held in position by nuts $b$ and also for the crank shaft 26.

Supported on the rods 29 and 30, are bearings $31^g$, in which, and alined bearings in the members $31^a$, are crank shafts 26 which are formed in two pieces and are telescoped together to allow for relative adjustment between the lower bearing $31^g$ and the upper bearings 32 and $31^a$. The crank portions of these shafts receive blocks 25, which operate in slotted ways 24, formed in bars 21. The forward ends of these bars are guided in openings formed in plates 33, threaded on the rods 29 and 30, while the opposite ends of bars 21, are fastened to a head plate 18.

Mounted on each crank shaft 26, is a gear 28, positioned so that the spiral ribs 27 will mesh with the teeth and gradually rotate the crank shafts.

Extending through vertically alined openings in the head plate 18, are bolts 19, each of which engages a threaded opening $19^a$, in a fork 12. The prongs $12^a$ of the fork are slotted at 14, to receive keys 13, while at the extreme inner end of each fork is a screw 15, provided with a head 14', formed on its periphery with a plurality of notches 16. Engaging the notches 16, are set screws 17, mounted in the forks adjacent the screws 15.

The head plate 18, supports a plurality of forks, and to hold the latter in vertical alinement, said forks are provided with slots $a^x$ through which pass keys $a$.

Extending from each fork is a blade 11, of thin metal, and formed with openings through which the keys 13 pass. The heads 14' of the screws 15, engage and clamp the blade, and the set screws 17, lock the heads in set position. Each blade is formed of flat metal and beyond the supporting fork is corrugated.

As previously stated, the means described for supporting the blades is the same on both sides of the apparatus, consequently the series of blades are stretched taut, and are in vertical alinement with the saw 1, the lowermost blade bearing directly on the saw.

In operation, the movement of the wire saw will rotate the pulleys 4 and 5, consequently the spiral ribs 27, will slowly rotate the crank shafts 26, and thereby reciprocate the plurality of blades 11, over the top of the saw. The movement of the blades is extremely slow compared with the movement of the saw, and the parts are so adjusted that the blades hold the saw down on the work.

The kerf is formed by the saw and as the latter is gradually fed to the work, the sand is shaken down through the spaces formed between the corrugated portions of the blades and the walls of the kerf, so that the sand is distributed to the saw, and a constant supply is at all times distributed thereto.

The corrugated portions of the blades eject the surplus sand, and serve to keep the kerf from unnecessary accumulation.

Obviously, by adjusting the screws 19, the tension of the blades can be regulated, and by adjusting the nuts $b-b$, the vertical position of said blades can also be adjusted.

To adapt the mechanism to different size pulleys, the nuts 37, and associated parts, and bolts 41, may be adjusted as will be readily understood.

The construction described serves to greatly facilitate the sawing operation because of the blades holding the wire saw down in close contact with the work, and because of the corrugated portions of the blades feeding a continuous and uniform supply of sand to the saw.

What I claim is:—

1. In combination, a saw, pulleys around which the saw passes, bearings for said pulleys, frames extending from the bearings, a plurality of corrugated blades operating over the saw, and means operated by the pulleys for reciprocating the blades.

2. In combination, a saw, a plurality of corrugated blades operating over the saw to hold the latter to the work, and mechanism operated by the saw including crank shafts for reciprocating the blades.

3. In combination, a saw, a sliding frame and a pulley, said pulley having spiral ribs, a plurality of reciprocating blades above and engaging the saw to hold the latter to its work, heads which support the blades, bars having slots and extending from the heads and reciprocating in the frame, crank shafts mounted in the frames, blocks on the cranks, said blocks sliding in the slots in the bars to impart reciprocating movement to the blades, and gears on the crank shafts, said gears meshing with the spiral ribs.

4. In combination, a saw, sliding frames and pulleys mounted in the sliding frames, each pulley having spiral ribs, reciprocating rods mounted in the frames, each rod having a slot, heads supporting the rods, forked blade supports mounted in the heads, means for maintaining the forked blade supports in alinement, a plurality of blades mounted in the blade supports, means for adjustably mounting the blades in the supports, means for adjusting the tension of the blades, sliding blocks mounted in the slots in the rods, and mechanism operated by the spiral ribs for operating the blocks to reciprocate the blades.

5. In combination, a saw, a reciprocating element which bears on and follows the saw to hold the same to its work, and mechanism operated by and movable with the pulley for reciprocating the element.

In testimony whereof I have hereunto set my hand in presence of two witnesses.

ALBERT LESPAGNOL.

Witnesses:
 GASTON PETIAN,
 H. C. COXE.